Figure 1:
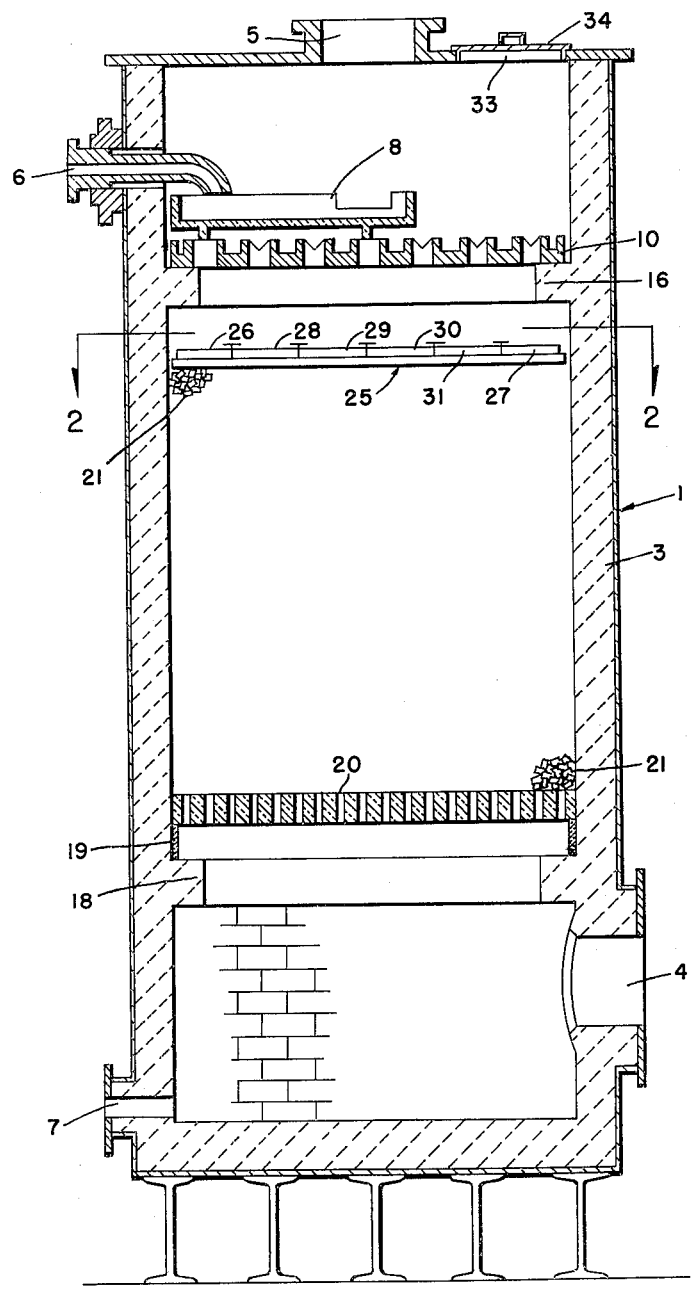

April 11, 1961     J. S. ECKERT     2,979,313
HOLD-DOWN PLATE

Filed Oct. 16, 1958     3 Sheets-Sheet 1

FIG. I

INVENTOR.
JOHN S. ECKERT
BY
ATTORNEY

April 11, 1961   J. S. ECKERT   2,979,313
HOLD-DOWN PLATE

Filed Oct. 16, 1958   3 Sheets-Sheet 2

*INVENTOR.*
JOHN S. ECKERT
BY
*ATTORNEY*

April 11, 1961 J. S. ECKERT 2,979,313
HOLD-DOWN PLATE
Filed Oct. 16, 1958 3 Sheets-Sheet 3
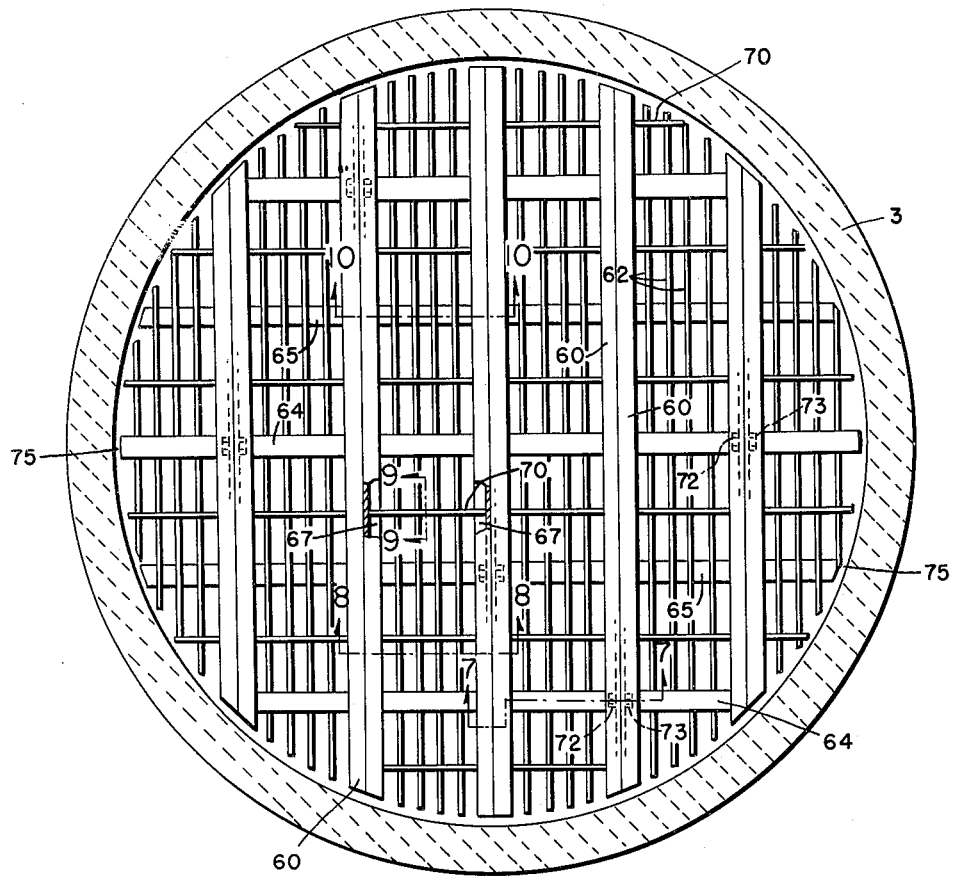
FIG. 6
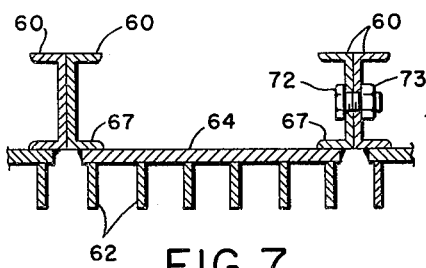
FIG. 7
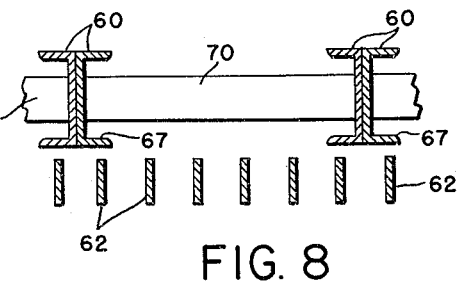
FIG. 8
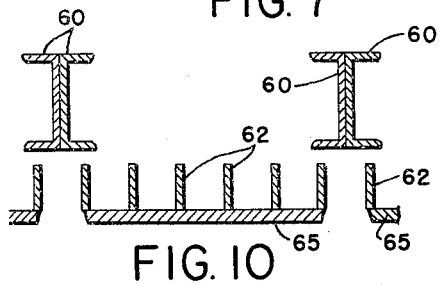
FIG. 10
FIG. 9
*INVENTOR.*
JOHN S. ECKERT
BY
ATTORNEY United States Patent Office 2,979,313
Patented Apr. 11, 1961

2,979,313
HOLD-DOWN PLATE

John S. Eckert, Silver Lake, Ohio, assignor to The United States Stoneware Company, Tallmadge, Ohio, a corporation of Ohio Filed Oct. 16, 1958, Ser. No. 767,539

1 Claim. (Cl. 261—94)

This invention relates to an improved hold-down plate to hold down the packing in a packed treating tower.

It is customary to provide a bed of metal, plastic, or ceramic packing elements in such a tower, such as rings, saddles, etc. to produce large surface contact between a liquid passed down through the tower and a gas or liquid rising up through the tower in order to effect mass transfer and/or heat transfer from one to the other. At times, local flooding occurs within such a tower which tends to lift and displace the packing elements at the top of the bed. Uniform results are obtained only if the depth of the bed of packing elements in the tower is kept substantially constant. Therefore, it is advantageous to employ a hold-down plate which prevents such movement of the packing elements within the tower. This hold-down plate must comprise a large percentage of open area in order to provide minimum interference with the countercurrent flow of the materials within the tower.

According to this invention, a manway is provided in the wall or the top of the tower, above the level of the packing elements and the hold-down plate is made in sections which may be passed through the manway. Thus, the hold-down plate may be disassembled and removed from the tower and then later reassembled in the tower, from time to time, as necessary, to remove or replace the packing elements, to repair or replace one or more sections of the hold-down plate, or to make other replacements or repairs within the tower.

Although cylindrical towers are the most common, they may be square, oval, hexagonal, etc. in cross section. The invention will be described herein more particularly as applied to a cylindrical tower, but it is to be understood that it is not limited thereto.

Generally, each section of the hold-down plate will have a frame around its outer edge, and when in place in the tower the sections will be fastened together by fastening contacting portions of the frames together. However, this is not necessary, and fingers extending outwardly at the edge of adjacent sections may be interlocked, or they may be staggered, etc.

In a hold-down plate for a cylindrical tower, the frames of the two end sections are formed of a curved member to conform to the shape of the inner wall of the tower, and a straight member along the other edge to be fastened to the straight edge of an adjacent section. The one or more sections between these outer sections have parallel straight members along their opposite edges. The ends of these sections may be curved or straight.

The area within the frames is largely open for the countercurrent passage of the materials being treated. The space may be covered with spaced straight members, or a mesh, or any other desirable structure in which at least 50 percent of the area is open. The open spaces in this area are so small, at least in one dimension, that the hold-down plate will remain on the top of the bed of packing elements but need not necessarily be as small as the minimum dimension of the packing.

Different forms of sectional hold-down plates are shown in the accompanying drawings, in which—

Figure 2:
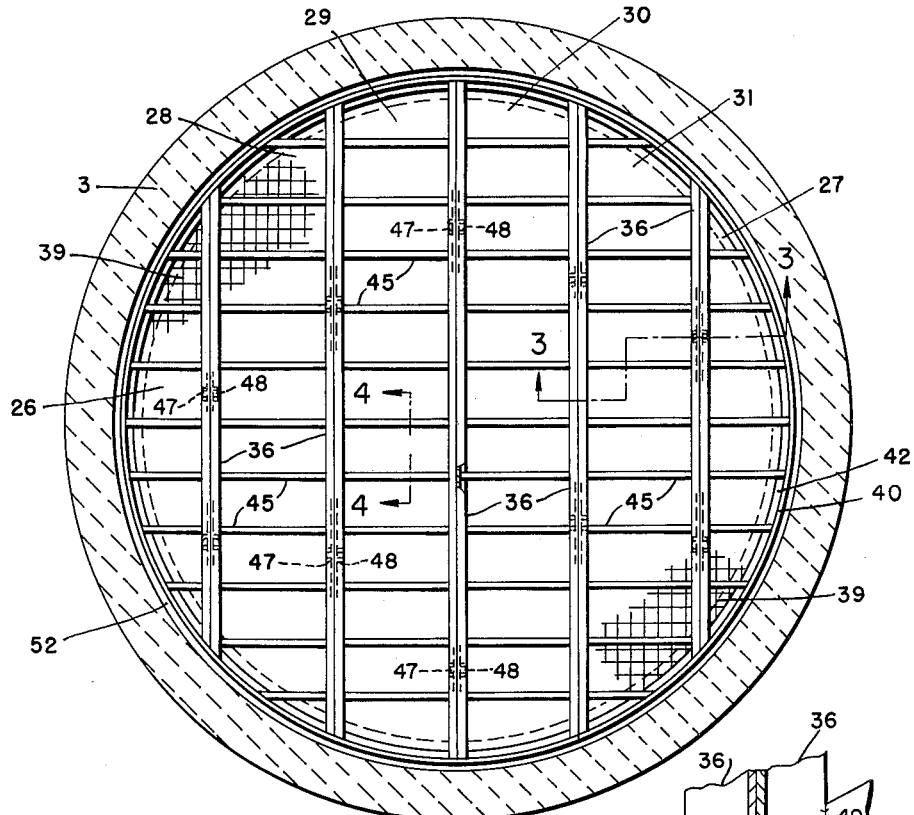
Figure 5:
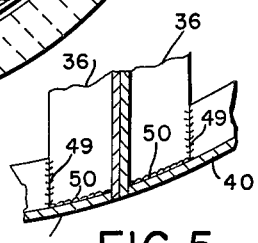
Figure 3:
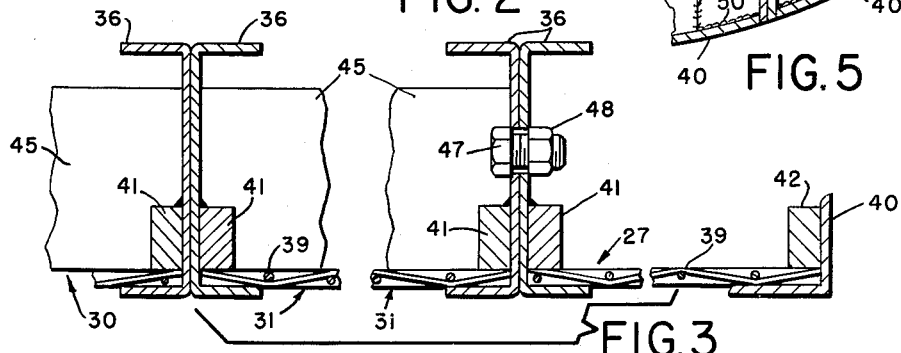
Figure 4:
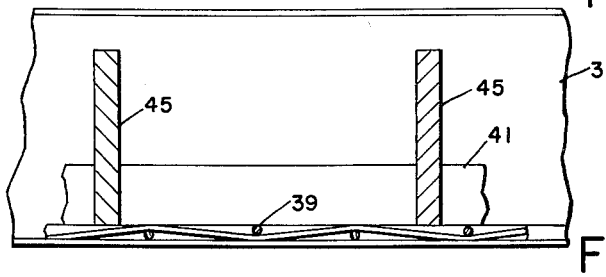

Fig. 1 is a section through a packed treating tower;
Fig. 2 is a plan view on the line 2—2 of Fig. 1;
Fig. 3 is a section through the hold-down plate on the broken line 3—3 of Fig. 2;
Fig. 4 is a section on the line 4—4 of Fig. 2;
Fig. 5 is a plan view of the base of the junction of the rounded outer walls and the channels at the juncture of two sections;
Fig. 6 is a plan view of a different type of hold-down plate in which a grid formed of metal bars is located within the frame of each section;
Fig. 7 is a section on the line 7—7 of Fig. 6 and shows how adjacent sections are held together;
Fig. 8 is a section on the line 8—8 of Fig. 6;
Fig. 9 is a vertical section on the line 9—9 of Fig. 6 through the spacer of one of the sections; and
Fig. 10 is a section on the line 10—10 of Fig. 6.

The tower 1 of Fig. 1 may be of any suitable design. The tower illustrated has a lined steel shell 3 with a gas opening 4 near the bottom and a gas outlet 5 at the top. The liquid inlet 6 is near the top and the liquid outlet 7 is near the bottom. The liquid inlet delivers liquid into the distributor head 8 which may be of any design, and supplies liquid to the distributor 10 which is supported by the shoulder 16 in the shell of the tower.

Just above the gas inlet is the shoulder 18 which, by means of a circular supporting ring 19 (which is made in sections), holds the support plate 20 which may be of any usual design. The packing elements 21 may be rings, saddles, or the like, and may be composed either of metal, plastic, or a ceramic material, etc.

The hold-down plate 25 is made in sections as more clearly shown in Figs. 2 and 3. The end sections 26 and 27 are sectors having one straight edge and one rounded edge. The other sections 28, 29, 30 and 31 have two straight side edges and rounded ends. The abutting edges between the sections are formed of inwardly facing channels as most clearly shown in Fig. 3 which shows a part of the sections 27 and 30 and both edges of the section 31. Each of these sections is narrow enough to be passed through the manway 33 which is closed by the cover 34. The channels 36 which form the straight edges of the respective sections fit back-to-back, and the screens 39 which extend from one end of the section to the other rest on the bottom flanges of the channels. These screens are of wire of sufficient strength to support the hold-down plate. The curved ends of the various sections, including the ends of the central sections 28 to 31 and the outer edges of the end sections 26 and 27, are formed of angles 40. The channels and angles are preferably of metal but may be of resistant rigid plastic or the like. In the drawings these elements are shown as being composed of metal and the edges of the screens are held in place by straight blocks 41 at the straight edges of the sections and by curved blocks 42 at the ends of the intermediate sections and at the rounded edges of the two end sections. These blocks are located on or near the screens and are welded to the respective channels and angles, and to the respective screens.

The bottom corners of the spacer plates 45 are cut away to fit over the members 41 and 42, and are welded to these and to the channels 36 and angles 40. They give rigidity to the several sections and the entire structure.

The sections are bolted together by bolts 47 and nuts 48. Only a few of the necessary bolts are shown in dotted lines in Fig. 2.

Figure 5 shows a plan view of one way of uniting the angle 40 to the channel at a corner of a section. The end of the bottom flange of the angle 40 is cut away so that it fits against the bottom flange of the channel 36 and is welded to it at 49. The perpendicular flange of the angle fits over the bottom flange of the channel and is welded to it at 50. Alternatively, the bottom flange of the channel can be cut away to fit around the angle.

The diameter of the outer edge of the hold-down plate, defined by the angles 40, is preferably somewhat smaller than the inner diameter of the tower, preferably by an inch or more. In Fig. 2 this is illustrated by the annular ring 52. Projections (not shown) extending an inch or two or more from the outer edge of the frame can be provided to assist in centering the hold-down plate within the tower.

The hold-down plate cannot be put in the tower after assembly because its outside diameter is greater than the inside diameter of the shoulder 16. Also, these towers quite often do not have removable tops. Unless the support plate 20 is formed in sections, it is put in place before the cover is put on the tower. The sections can be assembled before the top is put on the tower or afterward. If afterward, the sections are passed into the tower through the manway 33. The packing elements can be fed into the tower through the manway. The hold-down plate can be disassembled within the tower at any time, and one or more sections can be passed out through the manway for repair or replacement. The repaired or new sections are then introduced into the tower through the manway and the hold-down plate is reassembled in place.

A sectional hold-down plate of an entirely different construction is shown in Figs. 6 to 10. It is circular, and is preferably constructed of steel, but other metals, plastic, etc. may be used. The edges of the sections which are to be fastened together are formed of inturned channels 60. An angle may be used at the outer edge of the various sections, as in the hold-down plate previously described, but it will be noted that it is not necessary and is not shown in Figs. 6–10.

In this type of construction it is the width and not the length of the many openings which prevents passage of the packing elements through the hold-down plate. This dimension is defined by the spacing of the relatively thin parallel bars 62 which extend at least almost from one end of each section to the other. The tops and bottoms of these long bars are welded to the upper and lower cross bars 64 and 65. The lower cross bars 65 hold the bars 62 vertical, and are not essential except to provide rigidity.

In the preferred structure, the ends of the upper cross bars are welded to the under sides of the lower flanges 67 of the respective channels 60.

Spacers 70 are not essential but are desirable. Their ends are welded to the channels 60. The sections are bolted together by bolts 72 and nuts 73, there being at least two bolts per joint. As in the case of the hold-down plate previously described, the greatest diameter of this hold-down plate is less than the inside diameter of the tower leaving the annular space 75 an inch or two or more in width between the wall of the tower and the outer edge of the hold-down plate.

The sections are all narrow enough to pass through the manway in the tower. They can be disassembled and one or more passed through the manway out of the tower, and then passed back into the tower and bolted together again.

The foregoing is illustrative of the various types of hold-down plates that can be used. The invention is not limited to the constructions shown.

The following claims cover the invention.

What I claim is:

In a packed treating tower which has a support plate therein, a gas inlet and liquid outlet below the support plate, a bed of packing elements on the support plate, and above the bed a gas outlet and a liquid inlet, and a hold-down plate resting on the bed, the improvement constituted of a hold-down plate composed of a plurality of sections, each inner section of the hold-down plate having members angular in cross section each with an upright portion along the sides thereof with the upright portions of the members in adjacent sections in contact with one another and bolted together, with relatively thin elongated elements held lengthwise in each section between the angular side members by several horizontal cross pieces which are fastened alternately above and below the same, the space between each two of said elongated elements being so small that the hold-down plate will remain on top of the bed and at least largely prevent displacement of the packing elements at the top of the bed during local flooding of the bed, at least some of the cross pieces being attached at their ends to the angular members.

References Cited in the file of this patent

UNITED STATES PATENTS

| 377,580 | Spelman | Feb. 7, 1888 |
| 1,868,107 | Lachman et al. | July 19, 1932 |
| 2,050,935 | Dresser | Aug. 11, 1936 |
| 2,139,423 | Scheeler | Dec. 6, 1938 |
| 2,190,214 | Nagin | Feb. 14, 1940 |
| 2,582,657 | Serner | Jan. 15, 1952 |
| 2,713,478 | Ragatz | July 19, 1955 |

FOREIGN PATENTS

| 335,803 | France | Dec. 16, 1903 |
| 385,764 | France | Mar. 28, 1908 |
| 787,273 | France | July 1, 1935 |
| 1,083,938 | France | June 30, 1954 |